United States Patent
Knauerhase et al.

(10) Patent No.: US 6,941,146 B2
(45) Date of Patent: Sep. 6, 2005

(54) COMMUNAL DISCOVERY OF NETWORK COVERAGE

(75) Inventors: Robert Knauerhase, Portland, OR (US); Nikhil Deshpande, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 532 days.

(21) Appl. No.: 10/177,899

(22) Filed: Jun. 20, 2002

(65) Prior Publication Data

US 2004/0203718 A1 Oct. 14, 2004

(51) Int. Cl.$^7$ ................................................ H04Q 7/20
(52) U.S. Cl. ................. 455/456.3; 455/457; 455/552.1; 455/553.1; 342/450; 342/463
(58) Field of Search .............................. 455/456.1–457, 455/73, 552.1, 553.1, 238.1, 423; 342/443–446, 450, 458, 463

(56) References Cited

U.S. PATENT DOCUMENTS

| | | | | |
|---|---|---|---|---|
| 5,625,668 A | * | 4/1997 | Loomis et al. | 455/456.5 |
| 5,854,986 A | * | 12/1998 | Dorren et al. | 455/562.1 |
| 5,963,869 A | * | 10/1999 | Fehnel | 455/511 |
| 6,349,200 B1 | * | 2/2002 | Sabat et al. | 455/403 |
| 6,438,382 B1 | * | 8/2002 | Boesch et al. | 455/456.6 |
| 6,650,896 B1 | * | 11/2003 | Haymes et al. | 455/423 |
| 6,714,983 B1 | * | 3/2004 | Koenck et al. | 709/230 |
| 6,717,516 B2 | * | 4/2004 | Bridgelall | 340/572.1 |

* cited by examiner

*Primary Examiner*—Duc Nguyen
(74) *Attorney, Agent, or Firm*—Steven D. Yates

(57) ABSTRACT

Mobile devices having wired and/or wireless network connectivity, when operating in a location, contact one or more map servers to share connectivity information with the map server to allow the map server to create a global map. For example, if a mobile device has two different wireless connectivity options, such as Bluetooth and 802.11, when the mobile device is operated in the location, the mobile device tests whether both connectivity options are available in the location. The results of the test are provided to the central map server, which may integrate the results into the global connectivity map. A mobile device may also receive a connectivity map from the server indicating connectivity options available to the client in the location and possibly other locations as well. The connectivity map may include characteristics of connectivity options, such as cost, availability, etc., to allow the mobile device to choose a preferred connectivity option if multiple options are available.

27 Claims, 7 Drawing Sheets

COMMUNAL DISCOVERY OF NETWORK COVERAGE

FIELD OF THE INVENTION

The invention generally relates to determining and using network coverage maps, and more particularly to wireless devices providing their coverage data to facilitate determining a global coverage map that may be provided, at least in part, to a roaming device to facilitate the roaming device's acquiring connectivity.

BACKGROUND

With the advent easily of portable electronics and affordable networking technology, it has become possible to work (or play) in a variety of locations while retaining access to one's network resources. In particular, with recent advances of wireless networking technology, a current trend has been to provide some type of wireless networking services in various locations so that a traveler need not locate a traditional wired networking connection while traveling. For example, wireless connections can be found in transportation areas, e.g., airports, car/bus terminals, parking lots, etc., businesses, e.g., hallways, conference rooms, offices, cubicles, etc., as well as residential areas, e.g., homes, apartment complexes, etc.

Unfortunately, no single wireless networking standard is currently in use, and a traveler may encounter different wireless technologies in different locations. For example, the traveler may encounter Bluetooth environments, 802.11 environments (the term 802.11 is used to represent a family of wireless protocols specified by the Institute of Electrical and Electronics Engineers (IEEE), e.g., IEEE Std 802.11a-1999, IEEE Std 802.11b-1999, etc.), wireless optical environments, e.g., infrared, etc., or other wireless technology. In addition, each wireless connectivity option may have different associated costs or restrictions, e.g., restrictions on bandwidth, time of day usage, etc., as well as ancillary costs, e.g., airtime costs for an accessing device such as a cellular telephone.

Thus, when traveling, although there may be many different connectivity options in a particular area, there is no convenient and reliable way to know what wired or wireless services are available in the particular area. And, there is no convenient and reliable way to know associated costs for the services. Consequently, a traveler cannot plan with respect to expected future service availability.

BRIEF DESCRIPTION OF THE DRAWINGS

The features and advantages of the present invention will become apparent from the following detailed description of the present invention in which.

DETAILED DESCRIPTION

Figure 1:
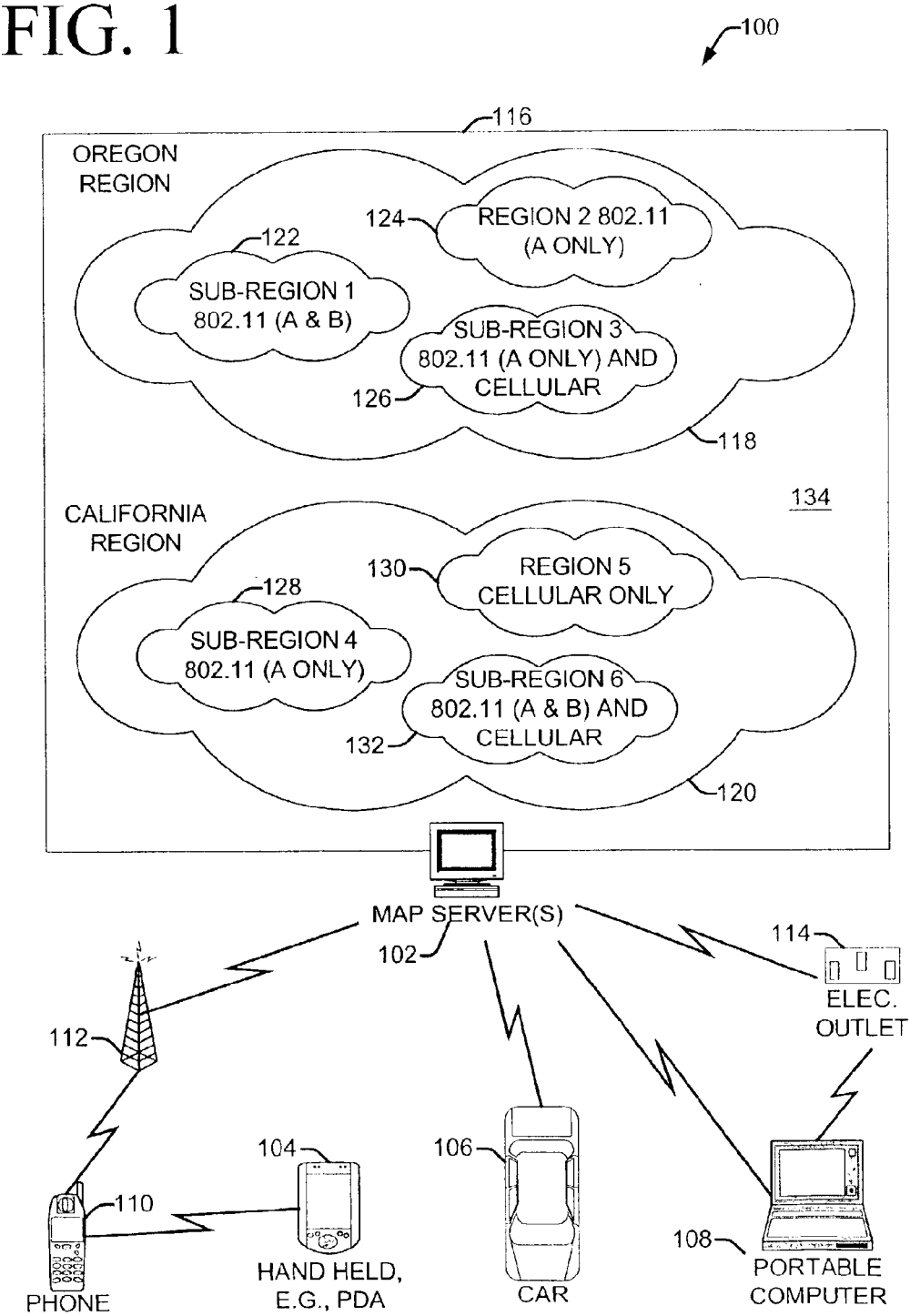
FIG. 1 illustrates a system including one or more central map servers, a peer map server, and various map clients.

FIG. 1 illustrates a system 100 including one or more central map servers 102, various map clients 104–108, and a map client 110 operating as both a map client and as a peer map server.

Various wired or wireless technology, or combinations thereof, may be used to connect clients 104–110 to a map server 102, including Bluetooth, 802.11, or wireless optical as discussed above, or other technology. For example, a cellular phone may connect with a map server 102 by way of a cellular tower 112, or a portable computer may connect by way of a network established over electrical wiring 114. As illustrated the cellular phone 110 is operating as a peer map server for a hand held device 104. It will be appreciated that the cell phone may serve maps that are stored in a memory of the phone, or it may act as a conduit to the map server and allow its connection to be used by other devices such as the hand held device.

Although only a single map server 102 is illustrated, it will be appreciated that one or more map servers may be employed to store a global coverage map 116. A global coverage map identifies, for various real-world locations (or regions), the types of network connectivity available in a given location. For example, connectivity data may include the types of wired or wireless service available for a location, location of hotspots, signal strength, access charges, speed limits, actual achieved throughput, cryptographic availability, service level guarantees, or any other information that may be used to characterize network connectivity. Regional servers may be used to increase server responsiveness or reduce access loads. For example, load balancing techniques may be employed to direct map server connections to a server nearest to a client or to a server having bandwidth to communicate with a server. Various map servers may then communicate to share their maps; alternatively, servers may transparently pass requests for coverage data in a particular region to a regional server for the particular region so that regional servers need only store data for their region.

In illustrated embodiments to be discussed further below, when a client 104–110 enters into a new location, it determines what network connectivity is presently available to the client, and provides this information to a map server 102. The map server then aggregates connectivity data received from various clients into the global coverage map 116. The client may request a map server to provide the client with a full or partial copy of the global coverage map to inform the client of connectivity options of which the client might not be aware. It will be appreciated that a client may request, in advance of a trip, coverage data for an area into which the client will be traveling, to allow the client to plan according to available network connectivity.

The exemplary illustrated global coverage map 116 indicates it includes connectivity data for Oregon and California regions. It will be appreciated that these are only exemplary coverage areas and that a global coverage map may have connectivity data for an arbitrary number of locations. As illustrated, the Oregon region has a bounding area 118, and the California coverage area has a bounding area 120, in which are illustrated various exemplary sub-regions 122–132. The in-between area 134 represents areas of no network connectivity, or areas for which connectivity is not yet known. The global coverage map data for the Oregon region 118 indicates sub-region 1 (122) has 802.11a and 802.11b connectivity, sub-region 2 (124) has 802.11a connectivity only, and sub-region 3 (126) has 802.11a and cellular connectivity. The global coverage map data for the California region 120 indicates sub-region 4 (128) has 802.11a connectivity only, sub-region 5 (130) only has cellular connectivity, and sub-region 6 (132) has 802.11a, 802.11b, and cellular connectivity.

In lieu of, or in addition to, traditional map building or map determination techniques, the global coverage map 116 may be created based on determinations of network connectivity by traveling clients 104–110 which share their determinations with map servers 102. Once a map is created, its contents may be continually updated, refined, and expanded by clients as they travel in and out of different locations and report their network connectivity. This provides for a map that is much more accurate and reliable than a map created by traditional mapping techniques.

Figure 2:
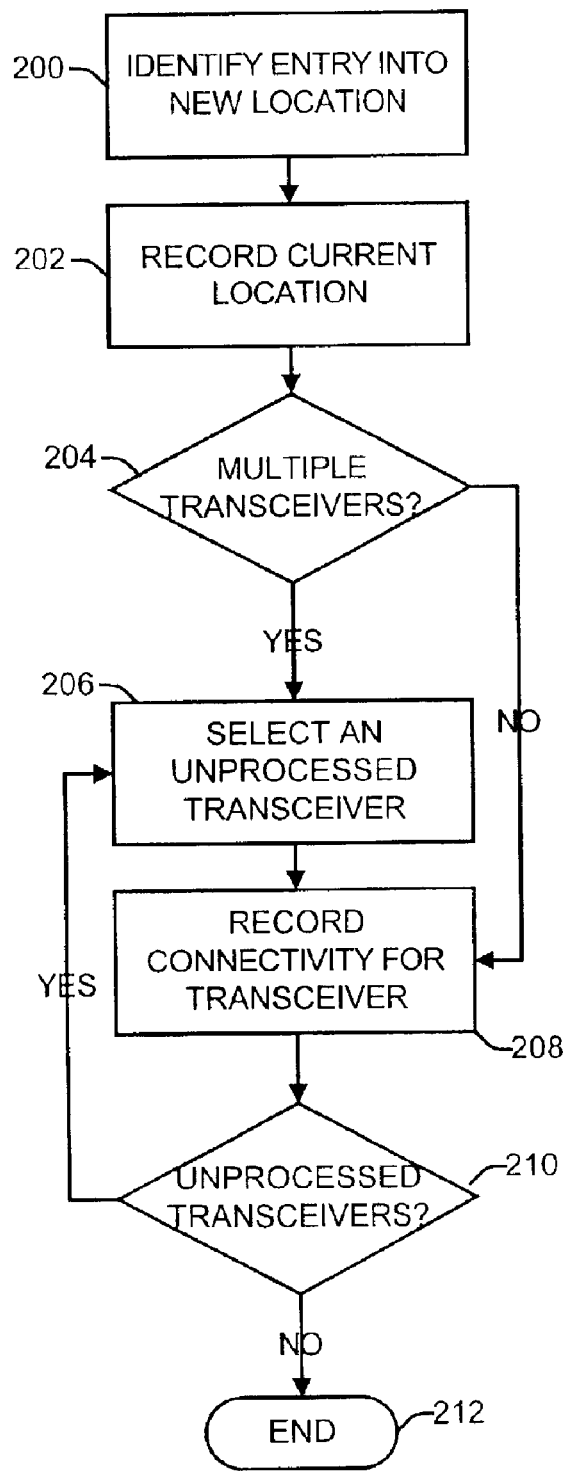
FIG. 2 illustrates a client entering a new location.

FIG. 2 illustrates a client entering a new location. As illustrated, the client identifies 200 it has entered a new location and records 202 the location in a local map associated with the client. The client may or may not have multiple transceivers, thus if, 204 there are multiple transceivers, the client selects 206 one of the transceivers and records 208 whether the selected transceiver has network connectivity.

Figure 3:
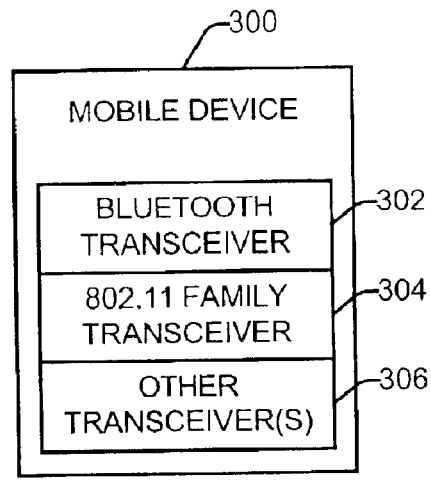
FIG. 3 illustrates an exemplary device having multiple transceivers which may be processed in accord with FIG. 2.

For example, FIG. 3 illustrates a mobile device 300 having, as is becoming frequently more common, multiple wireless (and/or wired) transceivers including a Bluetooth transceiver 302, an 802.11 transceiver 304, and an other transceiver(s) 306 not specifically identified. Assuming FIG. 2 is applied to the device of FIG. 3, the client first selects 206 the Bluetooth transceiver 302 and records 208 whether the identified 200 location provides Bluetooth service. If 210 there are remaining untested transceivers, e.g., the 802.11 and other transceivers 304, 306, they are also tested and their network connectivity recorded 208. When all transceivers have been processed, the illustrated operations end 210. Various embodiments may record 208 various data depending on the needs and requirements. For example, minimally, it is only necessary to record 208 what types of connectivity are available for a particular location.

Figure 4:
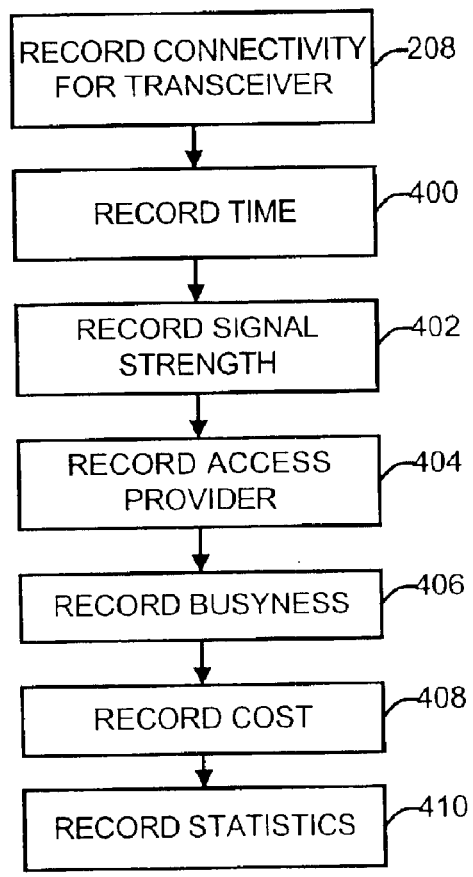
FIG. 4 illustrates exemplary connectivity characteristics that may be recorded for a device such as the FIG. 3 device.

FIG. 4, however, illustrates other exemplary network connectivity data that may be of interest and therefore be recorded 208. For example, after recording 208 whether a particular type of transceiver has connectivity, the client may also record 400 the time of the recording. The client may also record 402 the signal strength for the transceiver, e.g., record a numeric indicator or a text or other code indicating signal quality. The client may also record 404 an identifier, if available, for a provider of the network connectivity. For example, some 802.11 hotspots provide an identifier for the hotspot and/or of the owner of the hotspot. The client may also record 406 the busyness, or congestion, of the current location. When considered along with other data, such as the recorded 400 time, connection effectiveness may be measured for different times of day, allowing another client to determine whether to avoid connectivity at certain times of day. The client may also record 408 costs associated with using a particular transceiver in the current location. Also, the client may record 410 other arbitrary statistics (not specified) regarding use of a particular transceiver at the current location.

Figure 5:
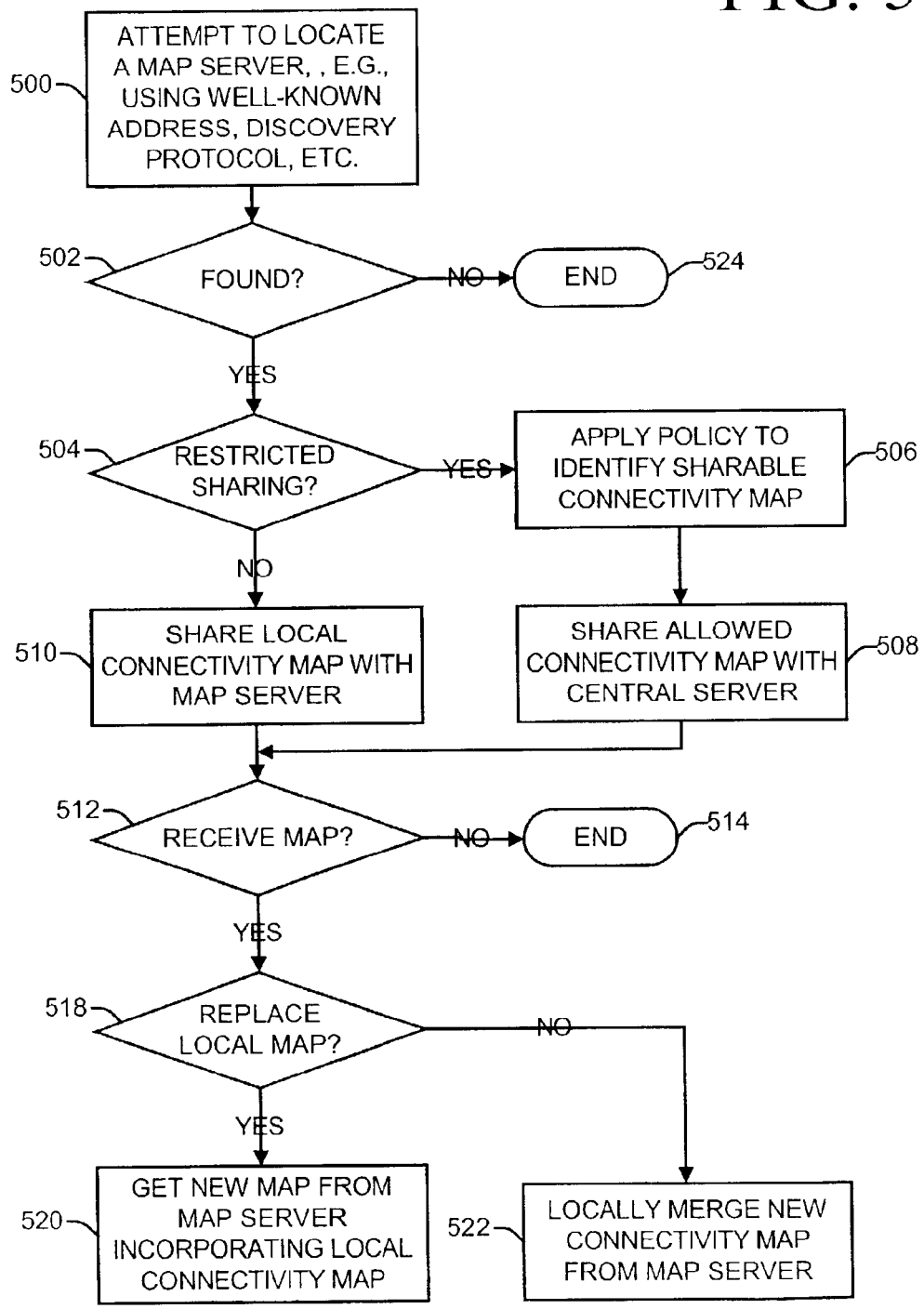
FIG. 5 illustrates a device sharing some or all of a local connectivity map with a map server.

FIG. 5 illustrates a device sharing some or all of a local connectivity map with a map server, and possibly receiving replacement map data from the map server.

As illustrated, a first operation is to attempt to locate 500 a map server, e.g., the FIG. 1 central map server 102 or peer map server 110. It will be appreciated that a variety of techniques and protocols may be utilized to locate a map server, such as connecting with a well-known address for a server or directory service for map server, use of a discovery protocol such as Ethernet broadcast discovery; Universal Description, Discovery and Integration (UDDI); Universal Plug and Play (UPnP), or other discover protocol. If 502 a map server is not found, in one embodiment, processing ends. In another embodiment, not illustrated, the search for the map server may be repeated.

If 502 a map server is found, a test is performed to determine if 504 sharing is restricted. For example, due to security, privacy, or other policy considerations, it might not be desirable for a client to simply dump its entire local connectivity map to the map server, and the client may elect to make available only a portion of its local connectivity map. Thus, if restricted sharing, an appropriate policy or rule is consulted and applied 506, and allowed portions of the client's connectivity map are shared 508.

If 504 sharing is not restricted, then the client's local connectivity map is shared 510 with the map server. Note that in some embodiments, the client and server may be configured to allow the server to pick and choose desired portions of the client's connectivity map. For example, even if the client is allowing the server access to its entire connectivity map, a regional server may nonetheless elect to take only portions of a client's connectivity map related to the server's service region.

After providing a local connectivity map to a server, the server may provide the client with an updated connectivity map. In one embodiment, the client may decide if 512 to receive the updated connectivity map. If not, processing ends 514. If so, a further test may be performed to determine if 518 the client's local connectivity map should be replaced with that received from the server. Replacement may be advantageous in that the server may be relied on to utilize superior processing power to integrate the client's local connectivity map into a global coverage map maintained by the server, and then provide an updated coverage map to the client. This facilitates having low-power clients as a map server may be relied on to perform complex operations and then provide results to the client. In one embodiment, not illustrated, the client sends control information to direct the server as to information the client desires from the server, for example, a portion of a global coverage map desired by the client.

If 518 the client local connectivity map is to be replaced, then the client gets 520 the new map from the map server incorporating the client's local coverage map that was shared 508, 510 with the map server. If the client local connectivity map is not to be replaced, then the client is responsible for receiving connectivity map data from the server and locally merging 522 the received map data, e.g., the client is responsible for merging the data received from the server with other data, if any, of the client.

Figure 6:
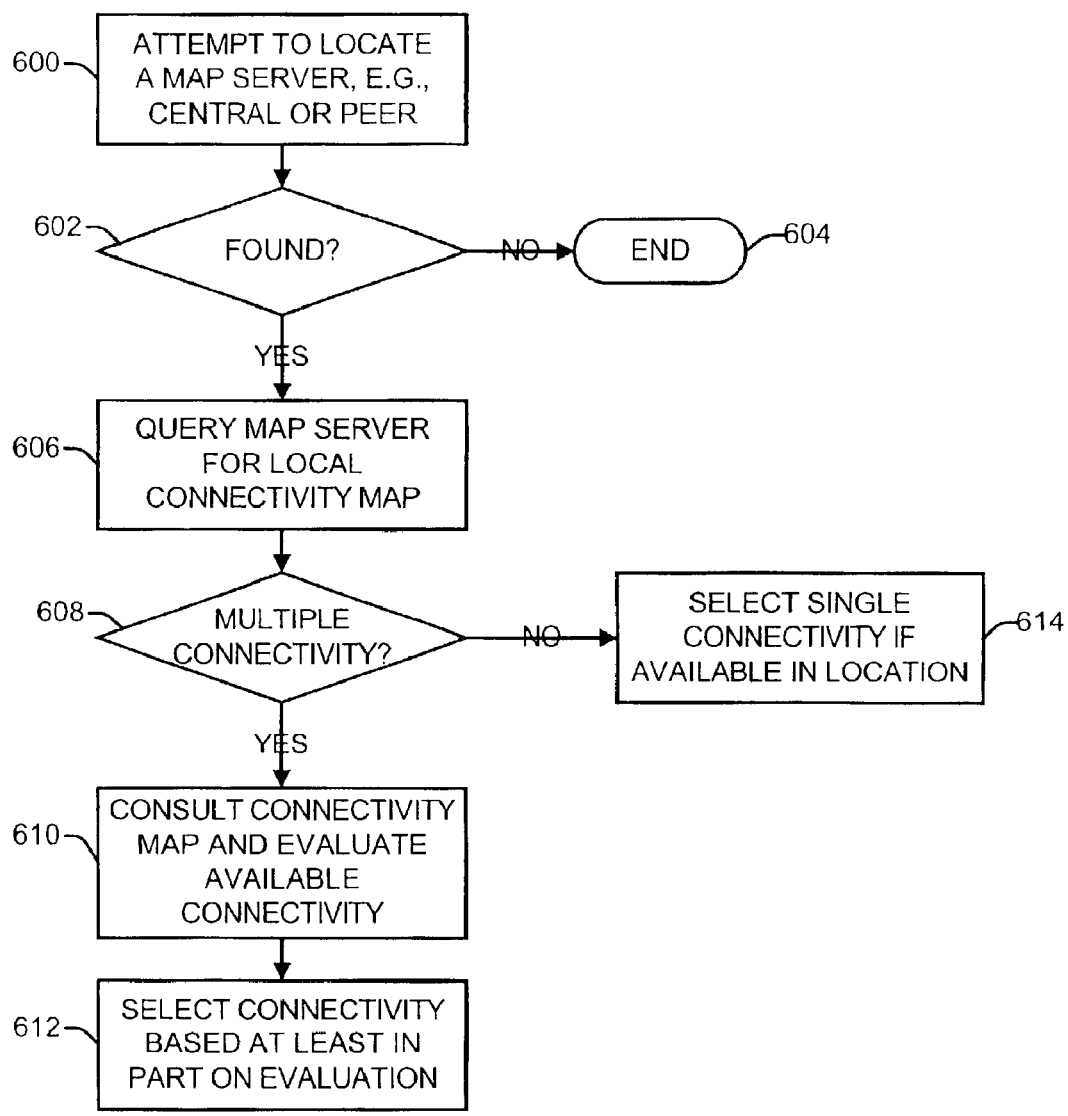
FIG. 6 illustrates selecting connectivity based at least in part on obtaining a connectivity map from a map server.

FIG. 6 illustrates selecting connectivity based at least in part on obtaining a connectivity map from a map server. As illustrated, a first operation is to attempt to locate 600 a map server, e.g. the FIG. 1 102 central server or peer server 110. If 602 no server is found, then processing ends 604. It will be appreciated that looping, time outs or other constructs, not illustrated, may be used to perform multiple attempts to connect with an available map server.

If 602 a map server is located, then it is queried 606 for a connectivity map. As discussed above, the client may simply receive and store whatever data is provided by the server, or the client may elect to selectively receive portions of connectivity data from the server. In one embodiment, the connectivity map received from the server comprises region indicators, which may be names of cities, towns, buildings, Global Positioning System (GPS) type coordinates, or other location references. It will be appreciated that many different notation approaches may be used to reference particular physical locations.

If 608 the client has multiple connectivity options, e.g., the client is configured such as the FIG. 3 device having three transceivers 302–306, the received connectivity map is consulted and evaluated 610 to see which available of the available connectivity options identified by the connectivity map are most desirable. As different network connectivity may have different restrictions, costs, etc., for a particular current location of the client there may be less desirable network connectivity. After evaluating available network connectivity, one is selected 612.

If the client did not have multiple connectivity options, e.g., the client may only have 802.11 type connectivity, then it is selected 614 (by default) if the connectivity is available in the current location. Note that the client may have obtained a connectivity map before traveling, so that once arriving, connectivity might not be available in a current location.) As with not finding 602 a map server, if the client's selected connectivity is not currently available, various polling or waiting techniques may be applied to obtain selected service. Also, if multiple connectivity is available, in one embodiment (not illustrated), if selected 612 connectivity is not available, the client may automatically fail-over and select a less desirable but available connectivity.

Figure 7:
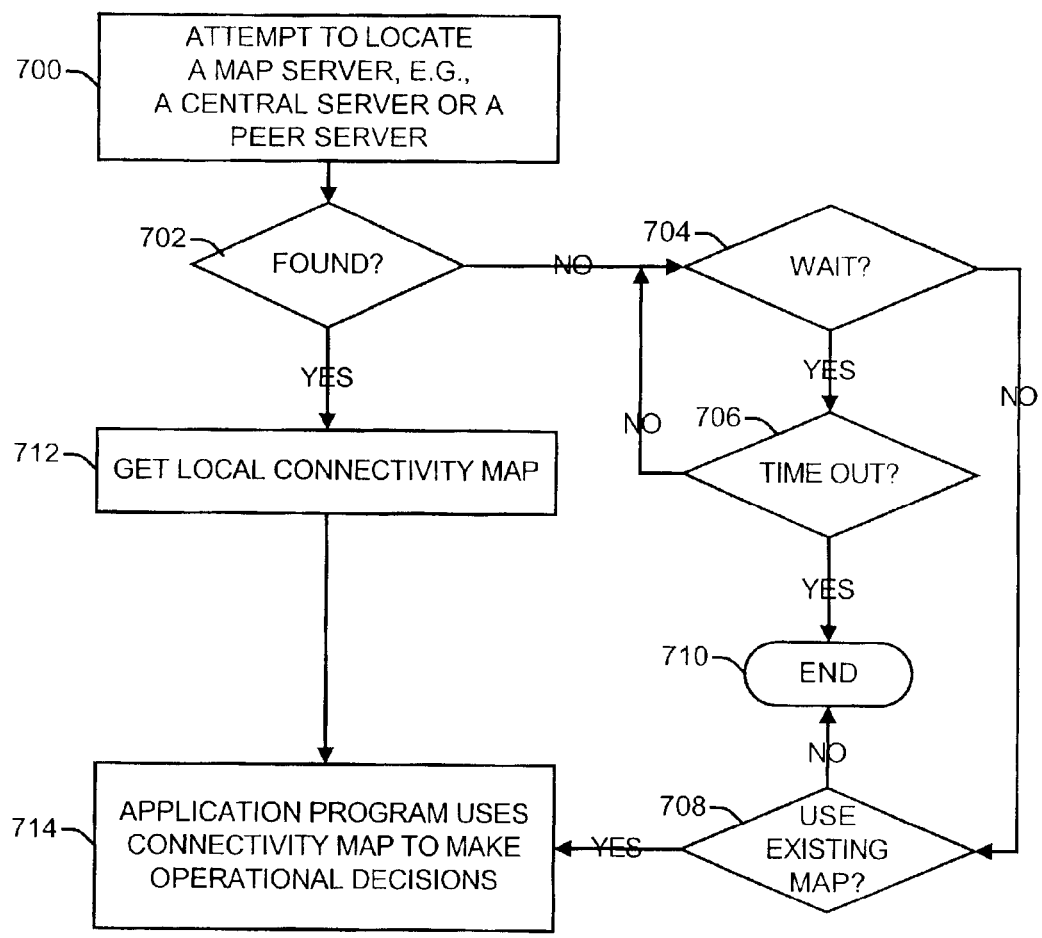
FIG. 7 illustrates a method for an application program to utilize a connectivity map to facilitate operation of the application program.

FIG. 7 illustrates a method for an application program to utilize a connectivity map to facilitate operation of the application program. As illustrated, a first operation is for the application program to locate 700 a map sever.

In this illustrated embodiment, if 702 a map server is not found, a test is performed to determine if 704 a wait loop (or other delay construct) should be executed. If 704 so, a test is performed to determine if 706 the loop has timed out. If not, processing loops. If 706 so, then processing ends 710. If 704 a wait loop is not executed, then a test is performed to determine if 708 an existing map ought to be used. A client may have an out of date map that includes some connectivity map data for a current location, or the client may have a map having default values; such existing maps may be used when an up to date connectivity map is not available. If 708 the existing map is not to be used, e.g., a user preference or system policy forbids it, then processing ends 710. In one embodiment (not illustrated), if 706 the wait loop times out, processing may continue with deciding 708 whether to use an existing map.

If 702 a map server is found, then the client gets 712 a connectivity map from the found map server. As discussed above, various techniques may be used to obtaining the connectivity map from the server. Once the connectivity map is obtained, the application program may then use the connectivity map to make operational decisions. For example, assuming the application program is a scheduling program, and a user desires to schedule a conference room with wireless connectivity, if the connectivity map indicates some rooms have wireless connectivity but some do not, the application program may use the connectivity map to identify rooms with wireless connectivity and schedule the conference room accordingly.

It will be appreciated that different application programs may use the connectivity map in different ways and that room scheduling is simply one exemplary use of a connectivity map. Another use, for example, is an application program scheduling a travel route such that a client device is kept optimally connected throughout the route. Many different operations may be performed depending on the application program and the needs of a client device and/or its user.

Figure 8:
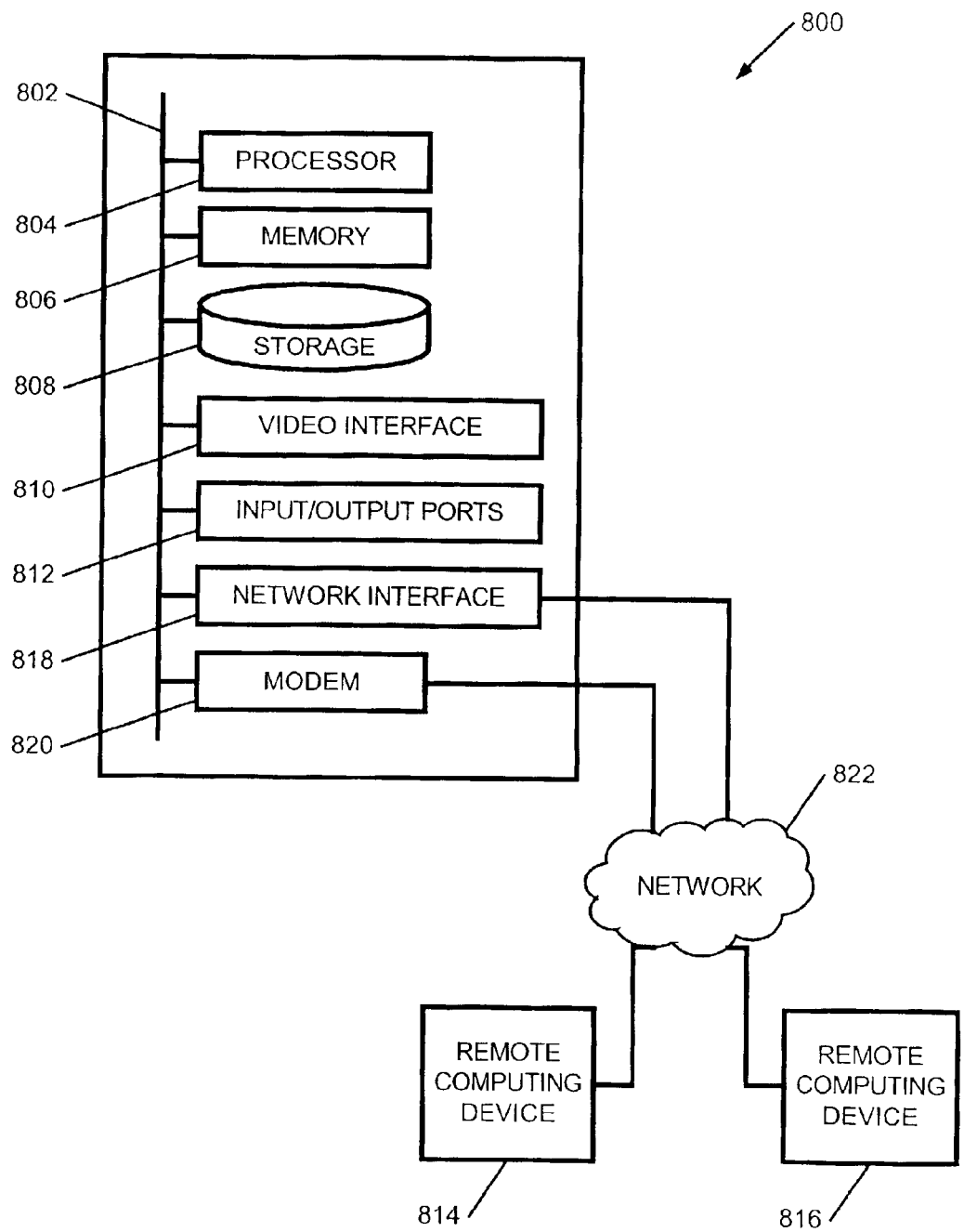
FIG. 8 illustrates a suitable computing environment in which certain aspects of the invention may be implemented.

FIG. 8 and the following discussion are intended to provide a brief, general description of a suitable computing environment in which certain aspects of the illustrated invention may be implemented. For example, the illustrated environment includes a machine 800 which may embody the map server 102 or traveling devices 104–110 of FIG. 1. As used herein, the term "machine" includes a single machine, such as a computer, handheld device, etc., or a system of communicatively coupled machines or devices.

Typically, the machine 800 includes a system bus 802 to which is attached processors 804, a memory 806 (e.g., random access memory (RAM), read-only memory (ROM), or other state preserving medium), storage devices 808, a video interface 810, and input/output interface ports 812. The machine may be controlled, at least in part, by input from conventional input devices, such as keyboards, mice, joysticks, as well as directives received from another machine, interaction with a virtual reality (VR) environment, biometric feedback, or other input source or signal.

The machine may also include embedded controllers, such as Generic or Programmable Logic Devices or Arrays, Application Specific Integrated Circuits, single-chip computers, smart cards, or the like, and the machine is expected to operate in a networked environment using physical and/or logical connections to one or more remote machines 814, 816 through a network interface 818, modem 820, or other data pathway. As discussed above with respect to FIG. 1, machines may be interconnected by way of a wired or wireless network 822, and may include data traveling over an intranet, the Internet, local area networks, wide area networks, and the like. It will be appreciated that network 822 may utilize various short range or long range wired or wireless carriers.

The invention may be described by reference to or in conjunction with program modules, including functions, procedures, data structures, application programs, etc. for performing tasks, or defining abstract data types or low-level hardware contexts. Program modules may be stored in memory 806 and/or storage devices 808 and associated storage media, e.g., hard-drives, floppy-disks, optical storage, magnetic cassettes, tapes, flash memory cards, memory sticks, digital video disks, biological storage. Program modules may be delivered over transmission environments, including network 822, in the form of packets, serial data, parallel data, propagated signals, etc. Program modules may be used in a compressed or encrypted format, and may be used in a distributed environment and stored in local and/or remote memory, for access by single and multi-processor machines, portable computers, handheld devices, e.g., Personal Digital Assistants (PDAs), cellular telephones, etc.

Thus, for example, with respect to the illustrated embodiments, assuming machine 800 embodies the map server 102 of FIG. 1, then remote machines 814, 816 may respectively be a the cellular phone 110 and automobile 106 of FIG. 1. It will be appreciated that remote machines 814, 816 may be configured like machine 800, and therefore include many or all of the elements discussed for machine 800.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method for a device having plural wireless transceivers and knowing its location for building a global coverage map, the method comprising:

recording the device's current location in a local connectivity map;

for each configuration of a first transceiver of the plural wireless transceivers, determining first connectivity for the first transceiver, and recording the first connectivity in the local connectivity map; and for each configuration of a second transceiver of the plural wireless transceivers, determining second connectivity for the second transceiver, and recording the second connectivity in the local connectivity map.

2. The method of claim 1, further comprising:
   recording a current time in a local connectivity map.

3. The method of claim 1, wherein the device further comprises at least one non-wireless transceiver, the method further comprising:

determining third connectivity for the non-wireless transceiver; and recording the third connectivity in a local connectivity map.

4. The method of claim 3, further comprising:
   wherein at least two of the plural wireless transceivers utilize different wireless protocols.

5. The method of claim 1, further comprising:
   making at least a portion of the local connectivity map available to a map server.

6. The method of claim 5, wherein the map server is configured to incorporate the local connectivity map into a global map.

7. The method of claim 6, further comprising:
   determining whether the map server is unavailable to receive the at least a portion of the local connectivity map.

8. The method of claim 6, further comprising:
   determining whether the map server is unavailable to receive the at least a portion of the local connectivity map contemporaneous with recording the determined connectivity for all configurations of the first transceiver.

9. The method of claim 8, further comprising:
   if the map server is unavailable, attempting to contact the map server in accordance with a schedule indicating when to attempt to provide the at least a portion of the local connectivity map to the map server.

10. The method of claim 3, wherein making the at least a portion of the local connectivity map available to the map server comprises a selected one of:

pushing the at least a portion of the local connectivity map to the map server; and receiving a request from the map server for the at least a portion of the local connectivity map.

11. A method for a device having plural wireless transceivers and knowing a current location to obtain at least a portion of a global coverage map, the method comprising:

identifying a map server for the global coverage map for the current location;

providing a description of the device to the map server;

receiving a coverage map from the map server per the description; and selecting a connection for the current location based at least in part on the coverage map.

12. The method of claim 11, wherein the description includes one or more capabilities of the device to facilitate the map server providing map data in accordance with the capabilities of the device.

13. The method of claim 12, wherein the capabilities of the device include one or more of a processor count, a processor speed, a processor load, and an available memory indicator.

14. The method of claim 11, further comprising:
    merging the coverage map with an existing coverage map.

15. A method according to claim 11, further comprising:
    selecting the connection also based at least in part on a policy.

16. A method according to claim 11, further comprising:
    identifying the map server utilizing selected ones of the following discovery protocols: contacting a well known address, the service discovery protocol, Universal Plug and Play (UPnP), and Universal Description, Discovery and Integration (UDDI).

17. A method according to claim 11, further comprising:
    planning a route based at least in part on the coverage map.

18. The method of claim 17, further comprising:
    providing the route to a user-perceptible interface to facilitate reporting the route to a user.

19. The method of claim 11, further comprising:
    anticipating coverage gaps based at least in part on the coverage map; and generating at least one alert for an anticipated coverage gap.

20. The method of claim 11, further comprising:
    scheduling a meeting location based at least in part on the coverage map.

21. The method of claim 11, further comprising:
    receiving a meeting request constrained with respect to the global coverage map.

22. An article, comprising:
    a machine-accessible medium having associated data, wherein the data, when accessed, results in a machine having plural wireless transceivers and knowing its location performing:

recording the device's current location in a local connectivity map;

for each configuration of a first transceiver of the plural wireless transceivers, determining first connectivity for the first transceiver, and recording the first connectivity in the local connectivity map; and for each configuration of a second transceiver of the plural wireless transceivers, determining second connectivity for the second transceiver, and recording the second connectivity in the local connectivity map.

23. The article of claim 22 wherein the machine-accessible media further includes data, when accessed by the machine, results in the machine performing:

making at least a portion of the local connectivity map available to a map server.

24. An article, comprising:

a machine-accessible medium having associated data, wherein the data, when accessed, results in a machine having plural wireless transceivers and knowing a current location performing:

identifying a map server for the global coverage map for the current location;

providing a description of the machine to the map server;

receiving a coverage map from the map server per the description; and selecting a connection for the current location based at least in part on the coverage map.

25. The article of claim 24 wherein the machine-accessible media further includes data, when accessed by the machine, results in the machine performing:

planning a route based at least in part on the coverage map.

26. The article of claim 24 wherein the machine-accessible media further includes data, when accessed by the machine, results in the machine performing:

anticipating coverage gaps based at least in part on the coverage map; and generating at least one alert for an anticipated coverage gap.

27. The article of claim 24 wherein the machine-accessible media further includes data, when accessed by the machine, results in the machine performing:

scheduling a meeting location based at least in part on the coverage map.

* * * * *